US 8,180,160 B2

(12) United States Patent
Sternby

(10) Patent No.: US 8,180,160 B2
(45) Date of Patent: May 15, 2012

(54) METHOD FOR CHARACTER RECOGNITION

(75) Inventor: Jakob Sternby, Lund (SE)

(73) Assignee: Zi Decuma AB, Lund (SE)

( * ) Notice: Subject to any disclaimer, the term of this patent is extended or adjusted under 35 U.S.C. 154(b) by 1072 days.

(21) Appl. No.: 11/947,197

(22) Filed: Nov. 29, 2007

(65) Prior Publication Data
US 2008/0130996 A1 Jun. 5, 2008

Related U.S. Application Data

(60) Provisional application No. 60/872,003, filed on Dec. 1, 2006.

(51) Int. Cl.
*G06K 9/62* (2006.01)
*G06K 9/34* (2006.01)
*G06K 9/00* (2006.01)

(52) U.S. Cl. .................. 382/224; 382/179; 382/187

(58) Field of Classification Search .......... 382/181–189, 382/173, 224, 179
See application file for complete search history.

(56) References Cited

U.S. PATENT DOCUMENTS

| 4,653,107 | A |   | 3/1987  | Shojima et al.  |         |
|-----------|---|---|---------|-----------------|---------|
| 4,731,857 | A |   | 3/1988  | Tappert         |         |
| 5,121,441 | A | * | 6/1992  | Chefalas et al. | 382/189 |
| 5,303,312 | A | * | 4/1994  | Comerford et al.| 382/189 |
| 5,615,283 | A |   | 3/1997  | Donchin         |         |
| 5,742,705 | A |   | 4/1998  | Parthasarathy   |         |
| 5,878,164 | A |   | 3/1999  | Brown et al.    |         |
| 6,044,174 | A |   | 3/2000  | Sinden          |         |
| 6,108,444 | A | * | 8/2000  | Syeda-Mahmood   | 382/186 |
| 6,175,651 | B1| * | 1/2001  | Ikebata et al.  | 382/187 |
| 7,302,099 | B2| * | 11/2007 | Zhang et al.    | 382/186 |
| 2005/0100214 | A1 |   | 5/2005 | Zhang et al. |   |
| 2006/0239560 | A1 |   | 10/2006 | Sternby  |    |

FOREIGN PATENT DOCUMENTS

| EP | 0151316    | 8/1985 |
| EP | 0768617 A2 | 4/1997 |
| WO | WO-0237933 | 5/2002 |

OTHER PUBLICATIONS

Halavati, R. et al.; "Evolution of Multiple States Machines for Recognition of Online Cursive Handwriting"; Jul. 24-26, 2006; World Automation Congress 2006; pp. 1-6, Budapest, Hungary.
Powalka, "An Algorithm Toolbox for On-Line Cursive Script Recognition", XP002211843, May 1995, retrieved online on Sep. 2, 2002 from url: http://citeseer.nj.nec.com/rd/70348799%2C209471%2C1%2C0.25%c2CDownload/http://citeseer.nj.nec.com/compress/0/papers/cs/8855/http:zSzzSzwww.doc.n.tu.ac.ukzSz~inkdataz SzrkpzSzthesis.main.ps.gz/an-algorithm-toolbox-for.ps; 313 pages.

(Continued)

*Primary Examiner* — Daniel Mariam
(74) *Attorney, Agent, or Firm* — Michael A. Glenn; Glenn Patent Group

(57) ABSTRACT

The present invention generally describes a method for classifying a line segment of a handwritten line into a reference feature set, wherein said handwritten line comprises one or several curves representing a plurality of symbols. First, sample data representing said handwritten line is received. Next, a sample line segment in said received sample data is identified by detecting a sample line segment start point (SLSSP) and a sample line segment end point (SLSEP). Then, a sample feature set of said identified sample line segment is determined. Finally, the determined sample feature set is matched to a reference feature set among a plurality of reference feature sets.

23 Claims, 8 Drawing Sheets

OTHER PUBLICATIONS

Sternby, "Frame Deformation Energy of On-Line Handwritten Characters"; Jan. 1, 2005; 10$^{th}$ IberoAmerican Congress on Pattern Recognition (CIARP) XP019023558, Nov. 15-18, 2005, pp. 128-137.

Sternby, "Structurally Based Template Matching of On-Line Handwritten Characters", Jan. 4, 2006; Pre-Proceeding Int'l Workshop on Frontiers in Handwriting Recognition, XP003016216, pp. 1-10.

* cited by examiner

METHOD FOR CHARACTER RECOGNITION

PRIORITY CLAIM

This application claims the benefit of priority to U.S. provisional patent application Ser. No. 60/872,003, filed on Dec. 1, 2006.

TECHNICAL FIELD

The present invention relates to a method for classifying a line segment of a handwritten line into a reference feature set, as well as a module, an apparatus and a computer program thereof.

BACKGROUND OF THE INVENTION

Today, handwriting is becoming an increasingly popular method for inputting data to data handling units, especially to mobile phones and Personal Digital Assistants (PDAs). In order to handle the input data, the handwriting must be recognized and interpreted. Most existing methods for recognizing handwriting require that the characters that are to be inputted are written one by one and are separately recognized. An example of such a method is provided in U.S. Pat. No. 4,731,857, but the most famous is Graffiti®, manufactured by Palm, Inc.

In order to speed up input of data it is desired that cursive handwriting is allowed. Today there are a couple of commercial systems allowing cursive handwriting. Since the recognition of cursive handwriting is far more complex than recognition of separate characters most commercial systems of today employ complicated statistical systems using neural networks and hidden Markov models with integrated dictionaries.

However, one of the drawbacks of the above mentioned systems is that they require high computational power. Further, the systems require large training sets and are highly dependent on the dictionary used.

SUMMARY

In view of the above, an objective of the invention is to solve or at least reduce the problems discussed above. In particular, an objective is to make the interpretation of a handwritten line representing one or several symbols more effective.

The above objective is provided according to a first aspect of the invention by a method for classifying a line segment of a handwritten line into a reference feature set, wherein said handwritten line comprises one or several curves representing a plurality of symbols, said method comprising receiving sample data representing said handwritten line, identifying a sample line segment in said received sample data by detecting a sample line segment start point (SLSSP) and a sample line segment end point (SLSEP), determining a sample feature set of said identified sample line segment, and matching said determined sample feature set to a reference feature set among a plurality of reference feature sets.

An advantage of this is that the sample feature set may contain a small amount of data, which is efficient from a memory usage point of view.

Further, the plurality of reference feature sets may, because of the similarities among the reference feature sets, be stored in a data base, which is efficient from a memory usage point of view.

Another advantage is that a relatively small number of features is comprised within said sample feature set. This means that few parameters are involved in the matching process, which, in turn, means that the matching process may be made rapidly and efficiently.

The steps of receiveing, identifying, determining, matching and assigning of said method may be performed successively.

Further, the plurality of reference feature sets may be predetermined.

The determination of the sample feature set of the method according to the first aspect may further comprise determining a length between said SLSSP and said SLSEP, and associating said length to said sample feature set.

The determination of the sample feature set of the method according to the first aspect may further comprise generating a normalized length of said length by taking prior determined lengths into account.

The determination of the sample feature set of the method according to the first aspect may further comprise determining a first angle between a gradient of said line segment in said SLSSP and a segment specific reference line intersecting said SLSSP and said SLSEP, and associating said first angle to said sample feature set.

The determination of the sample feature set of the method according to the first aspect may further comprise determining a second angle between a gradient of said line segment in said SLSEP and a segment specific reference line intersecting said SLSSP and said SLSEP, and associating said second angle to said sample feature set.

The determination of the sample feature set of the method according to the first aspect may further comprise determining a general angle between the segment specific reference line intersecting said SLSSP and said SLSEP and a reference line corresponding to a writing direction, and associating said general angle to said sample feature set.

The determination of the sample feature set of the method according to the first aspect may further comprise determining a type curve matching said line segment, and associating said type curve to said sample feature set.

The reference feature set may comprise a minimum value and a maximum value for each feature.

The sample data may comprise coordinate data.

The above objective is provided according to a second aspect of the invention by a module for classifying a line segment of a handwritten line into one reference line segment of a reference line segment set, wherein said handwritten line comprises one or several curves representing a plurality of symbols, said module comprising a receiver configured to receive data representing said handwritten line, an identifier configured to identify a sample line segment in said received data by detecting a sample line segment start point (SLSSP) and a sample line segment end point (SLSEP), a determinator configured to determine a sample feature set for said identified sample line segment, a matcher configured to match said determined sample feature set to a reference feature set among a plurality of reference feature sets, and a transmitter configured to output said matching reference feature set.

The advantages of the first aspect of the invention are also applicable for this second aspect of the invention.

The determinator of the module according to the second aspect may further comprise a length determinator configured to determine a length between said SLSSP and said SLSEP, and an associater configured to associate said determined length to said sample feature set.

The determinator of the module according to the second aspect may further comprise a storage medium comprising a number of prior determined lengths, a length transformer configured to normalize said length to a normalized length by taking said prior determined lengths comprised within said storage medium into account, and an associater configured to associate said determined normalized length to said sample feature set.

The determinator of the module according to the second aspect may further comprise an angle determinator configured to determine an angle between said line segment and a reference line intersecting said SLSSP and said SLSEP, and an associater configured to associate said determined angle to said sample feature set.

The angle determinator may be configured to determine the first angle and/or the second angle.

The determinator of the module according to the second aspect may further comprise a general angle determinator configured to determine a general angle between a segment specific reference line intersecting said SLSSP and said SLSEP and a reference line corresponding to a writing direction, and an associater configured to associate said determined general angle to said sample feature set.

The determinator of the module according to the second aspect may further comprise a type curve determinator configured to determine a type curve matching said line segment, and an associater configured to associate said determined type curve to said sample feature set.

The above objective is provided according to a third aspect of the invention by an apparatus comprising a pen movement capturing device configured to receive data representing a handwritten line, a module, as described above, configured to receive said data from said touch sensitive area and to output reference feature sets, a symbol matcher configured to match said reference feature sets into a symbol set corresponding to a symbol, and a display configured to present said symbol.

The advantages of the first aspect of the invention are also applicable for this third aspect of the invention.

The pen movement capturing device may be a touch sensitive area of the apparatus. In that case, the touch sensitive area of the apparatus may be combined with the display of the apparatus.

The apparatus may further comprise a symbol set database comprising a number of reference line segment combinations and their associated symbol sets.

The invention may also be embodied as a computer readable memory device having stored thereon instructions that are executable by a computer. The instructions may cause a computer to carry out a method according to the invention.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
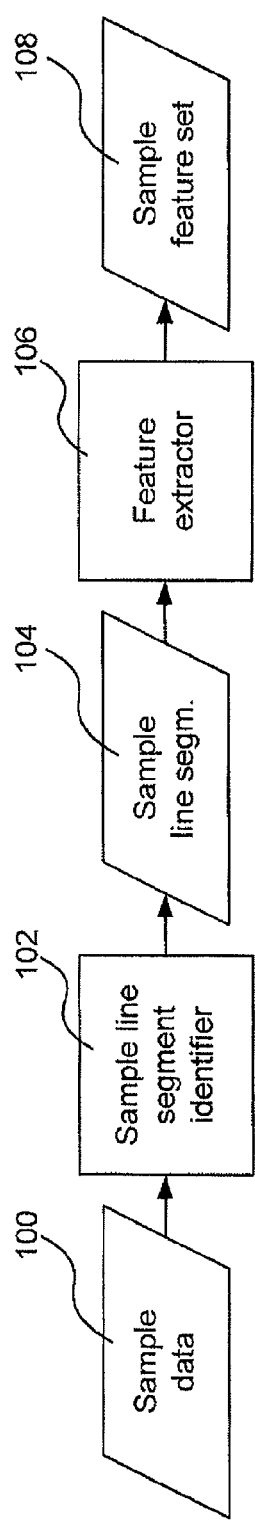
FIG. 1 generally illustrates generation of a sample feature set from input sample data.

FIG. 1 illustrates generation of a sample feature set 108 from input sample data 100. The sample data 100 may be any type of digital data representing a handwritten line forming one or several symbols. For instance, the sample data 100 may be consecutive coordinate data input via a touch screen of a personal digital assistant ("PDA") or a mobile phone.

Figures 6, 7:
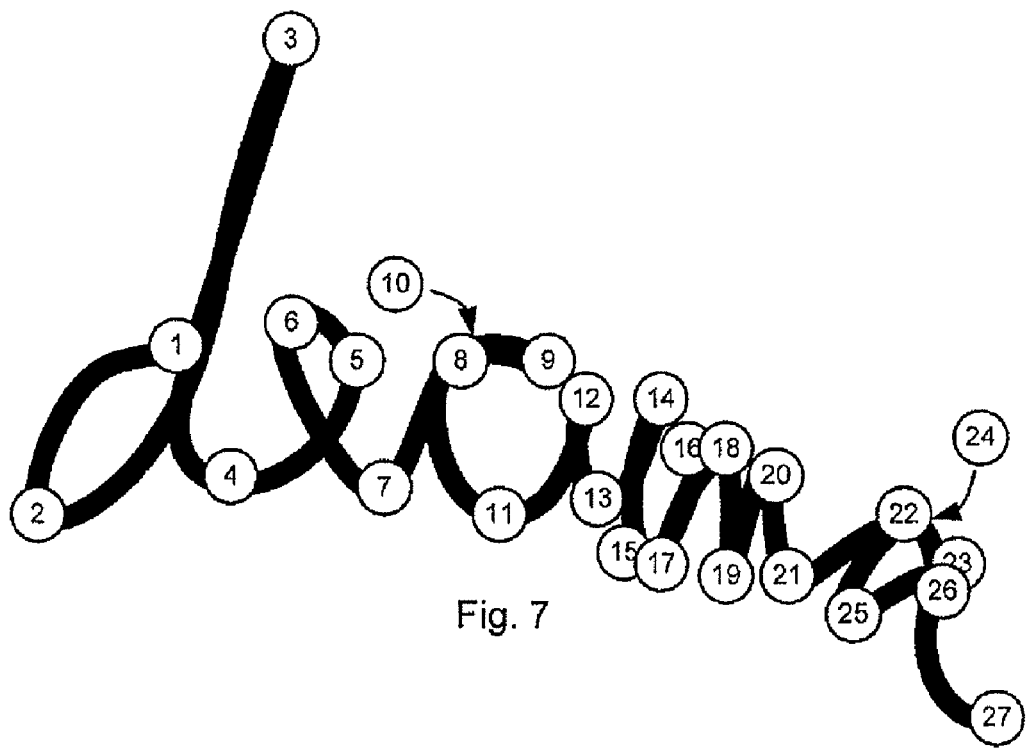
FIG. 6 illustrates an example of a handwritten line representing a number of symbols.
FIG. 7 illustrates the example of FIG. 6 with indicated segmentation points, denoted 1 to 27.
Figure 8:
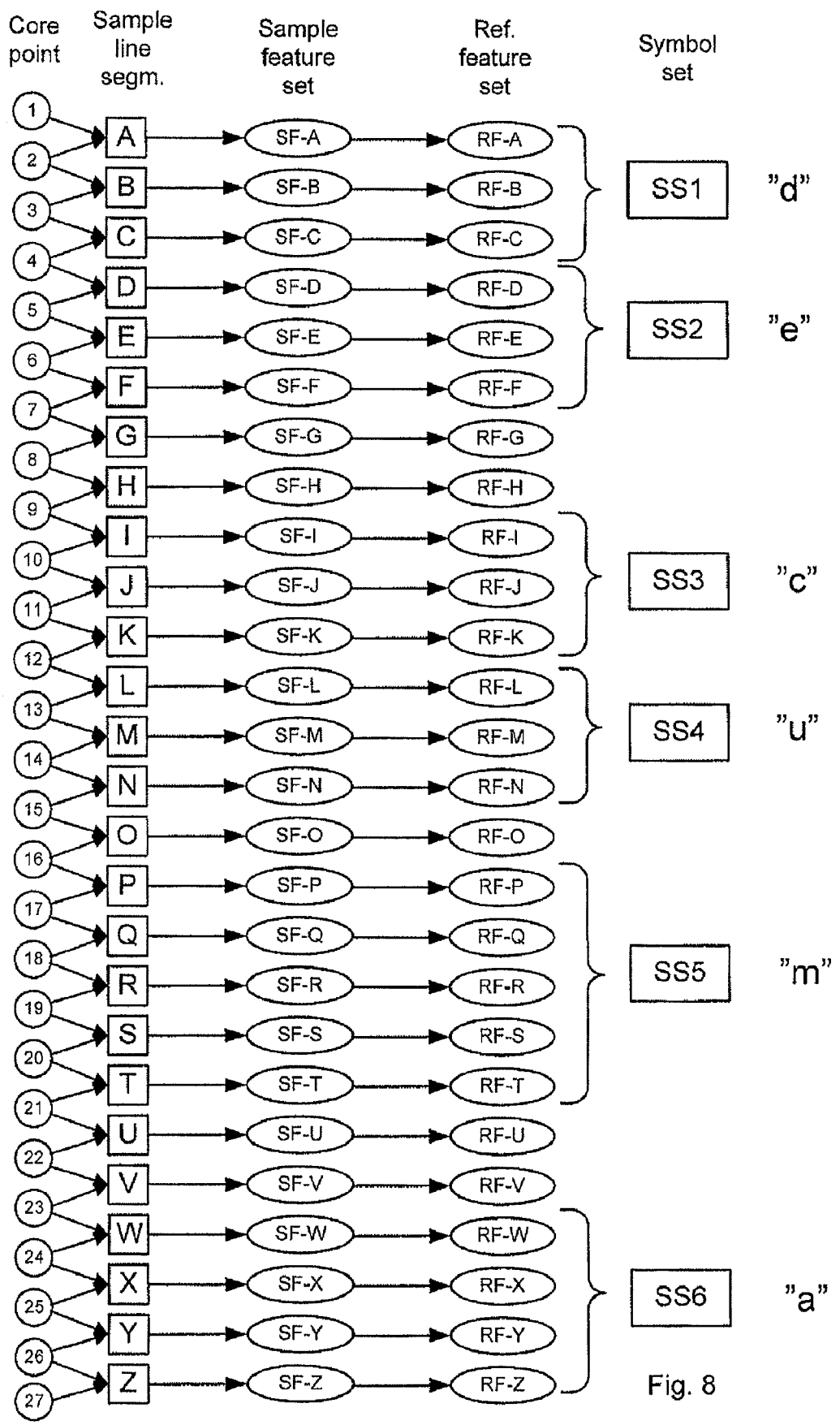
FIG. 8 illustrates interpreting the segmentation points of the exemplified handwritten line according to FIG. 7.

The sample data 100 can be input to a sample line segment identifier 102, wherein a sample line segment 104 can be generated based on the sample data 100. A sample line segment identifier 102 is further illustrated in FIG. 2, and an example of the principle is illustrated in FIGS. 6-8.

Further, the sample line segment 104 can be input to a feature extractor 106, wherein a number of features of the sample line segment may be extracted. Such features may, for instance, be a length, a number of angles and a type curve representing the shape of the sample line segment. These features are further illustrated in FIG. 5. Hereinafter, features of the sample line segment are referred to as a sample feature set 108.

Figure 2:
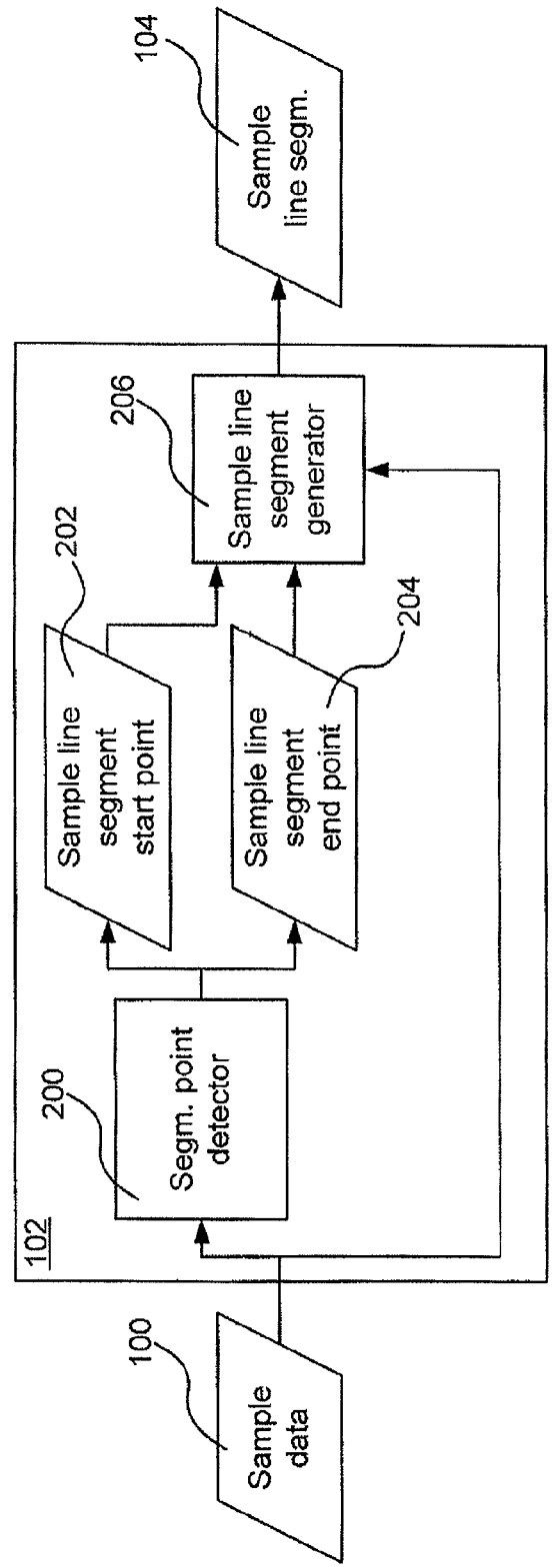
FIG. 2 illustrates the generation of a sample line segment from the sample data in further detail.

In FIG. 2, the generation of the sample line segment 104 from the sample data 100 is illustrated in further detail.

The sample data 100 can be input to a segmentation point detector 200. In the segmentation point detector 200, a sample line segment start point (SLSSP) 202 and a sample line segment end point (SLSEP) 204 can be detected. The SLSSP 202 indicates the start of the line segment and the SLSEP 204 indicates the end of the line segment.

Figure 5:
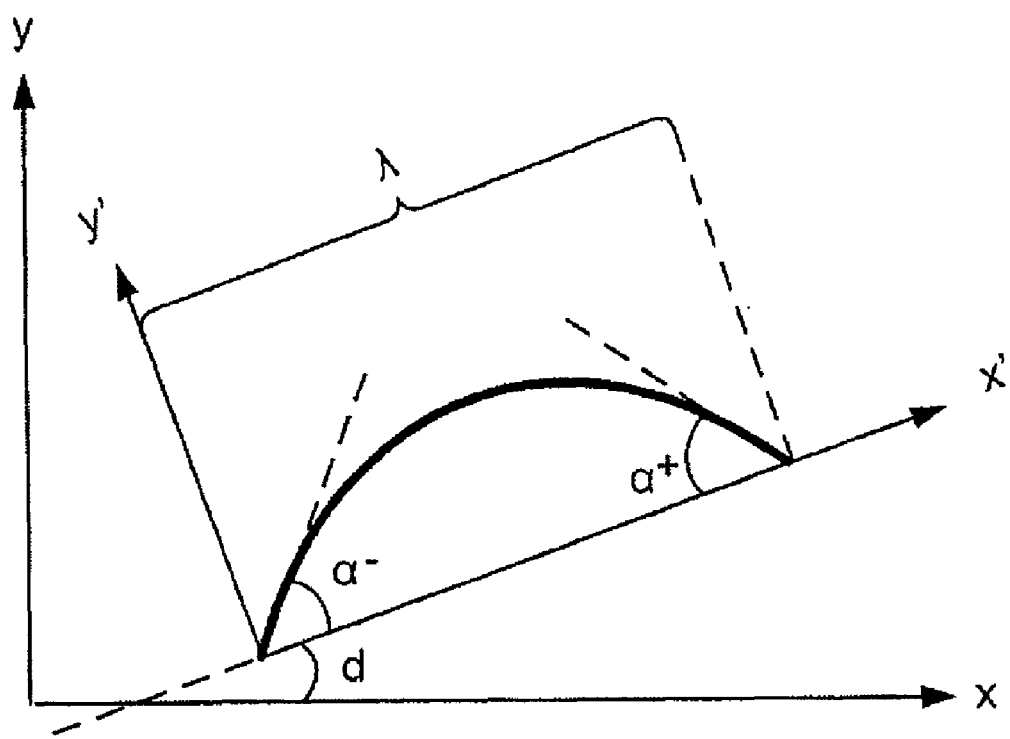
FIG. 5 generally illustrates an example of a sample line segment and associated sample features.

The segmentation point detector 200 may be configured to detect extreme points of the sample data 100 in a direction, in FIG. 5 indicated as y, orthogonal to a main writing direction, in FIG. 5 indicated as x.

If the detected line segments are intended to be consecutive, the SLSSP 202 may be the SLSEP 204 of the prior detected sample line segment. In this way only the SLSEP 204 of the present sample line segment is to be detected.

Further, when detecting the first line segment of the sample data 100, the first received coordinate data can be set to be the SLSSP 202. Likewise, when detecting the last line segment of the sample data 100, the last received coordinate data can be set to be the SLSEP 204.

By inputting the sample data 100, the SLSSP 202 and the SLSEP 204 into a sample line segment generator 206, the sample line segment 104 may be generated.

Figure 3:
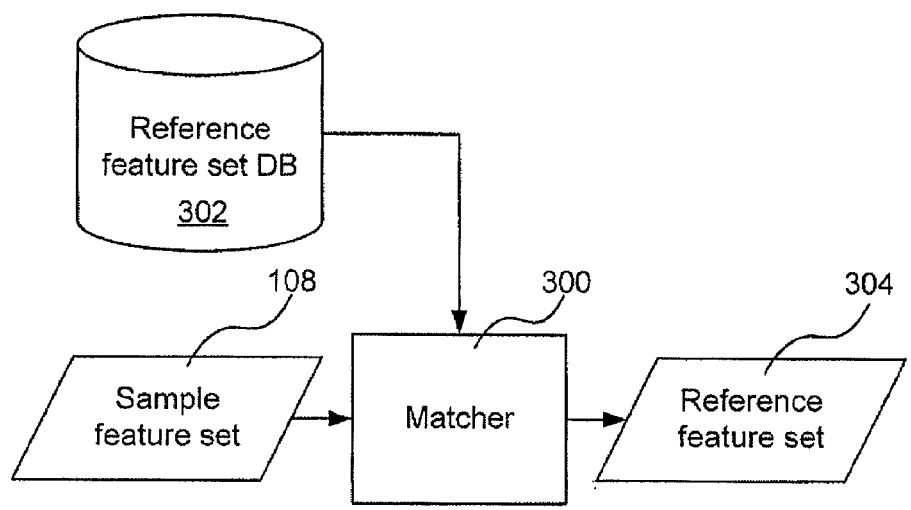
FIG. 3 generally illustrates matching of the sample feature set to a reference feature set.

FIG. 3 generally illustrates a second part of the general principle of the present invention, namely the matching of the sample feature set 108 to a reference feature set 304.

In more detail, the sample feature set 108 can be input to a matcher 300.

Secondly, the matcher compares the input sample feature set 108 with a number of reference feature sets comprised in a reference feature set database 302.

Thirdly, when a matching reference feature set is found, this matching reference feature set 304 is output from the matcher 300.

Since each of the reference features comprised in the reference feature set 304 are known from the database 302, the reference feature set may only be expressed by a set of reference numbers, which implies an efficient memory usage.

The generation of reference feature sets may be performed successively, i.e. as soon as the user inputs new sample data, the sample data may be transferred to the sample line segment identifier 102, wherein the sample line segment 104 is generated as soon as the SLSSP 202 and the SLSEP 204 are detected, and so forth.

To sum up, the sample line segement 104 is generated by identifying the SLSSP 202 and the SLSEP 204 in said sample data 100, as illustrated in FIG. 1 and 2. Next, the sample feature set 108 may be determined for the sample line segment 104, as illustrated in FIG. 1. Then, the reference feature set 304 corresponding to the sample feature set 108 is determined, as illustrated in FIG. 3.

An advantage of substituting the sample feature set 108 with the reference feature set 304 is that the further processing, such as determining the best symbol match for which a number of line segments corresponds to, can be made more efficient, since a number of calculations can be pre-calculated and stored in a look-up table.

Figure 4:
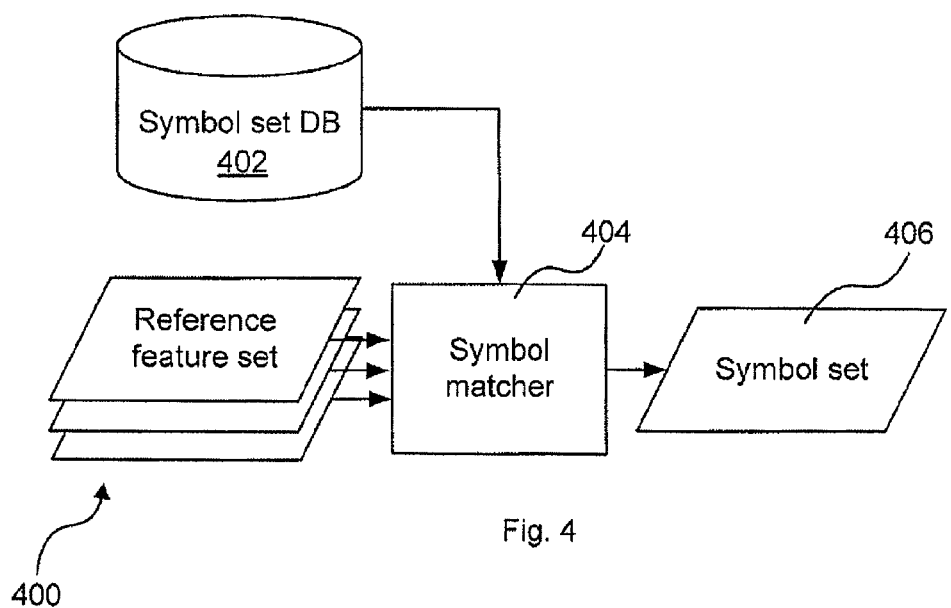
FIG. 4 generally illustrates the generation of a symbol set from a number of reference feature sets.

FIG. 4 generally illustrates the generation of a symbol set 406 from a number of reference feature sets 400.

Generally, after having determined the number of reference feature sets 400, these can be used to find the best matching symbol set 406. The symbol set 406 comprises a number of feature reference sets that has the smallest feature distance to the feature sets 400.

In more detail, the number of reference feature sets 400 is input to a symbol matcher 404 which can be connected to a symbol set database 402. If the best matching reference feature sets found in the symbol database 402 with respect to the reference feature set 400 correspond to the symbol set 406, this particular symbol is output from the symbol matcher 404.

Optionally, the symbol matcher 404 can be set to detect symbols of a certain group, such as greek letters. By setting the group of symbols the accurracy of the symbol matcher may be improved.

Optionally, a dictionary (not shown) may be associated to the symbol matcher 404. This may further improve the function of the symbol matcher 404.

FIG. 5 generally illustrates an example of a sample line segment and associated sample features.

Instead of processing the sample line segment as such, a number of features describing the sample line segment may be determined. Such a feature may, for instance, be a length $\lambda$, a first angle $\alpha^-$, a second angle $\alpha^+$, a general angle d and a type curve.

The length $\lambda$ may be determined as the distance between the SLSSP and the SLSEP of the line segment.

The first angle $\alpha^-$ may be determined as an angle between a gradient of said line segment in said SLSSP and the segment specific reference line x', wherein the segment specific reference line x' corresponds to a line intersecting the SLSSP and the SLSEP.

The second angle $\alpha^+$ may be determined as an angle between a gradient of said line segment in said SLSEP and the segment specific reference line x'.

The general angle d may determined as an angle between the segment specific reference line x' and a reference line x corresponding to a main writing direction.

The shape of the line segment may be associated to a type curve. This association may be achieved by first calculating a number of type curve distances between the present line segment and a number of predetermined type curves in a database. Then, the type curve of the database giving rise to the smallest type curve distance, i.e. the closest match, is chosen as the type curve of the present line segment.

Since the type curves can be comprised in a database, the type curve can be expressed by only using a reference numeral, which implies better memory usage.

FIG. 6 illustrates an example of a handwritten line representing a number of symbols. In this example, the number of symbols is constituted by six letters, "d", "e", "c", "u", "m" and "a".

FIG. 7 illustrates the example of FIG. 6 with indicated segmentation points, denoted 1 to 27. The segmentation points can be detected successively, i.e. as the user writes, segmentation points are detected. In this way the segmentation points of the handwritten line are placed in the same order as they have been input by the user.

The first detected segmentation point, denoted 1, can be detected as the first input of the handwritten line made by the user. Likewise, the last detected segmentation point, denoted 27, can be detected as the last input of the handwritten line made by the user.

The remaining intermediate segmentation points, denoted 2-26, can be points holding information of directional changes of said handwritten line. For instance, in the segmentation point 2, the handwritten line changes direction from downwards to upwards.

Further, local extreme points of said handwritten line in a direction orthogonal to a main writing direction can also be set as segmentation points.

A condition may be set that stipulates that a certain number of segmentation points, such as one to three, is present between each pair of local extreme points.

Further, a point in which the absolute value of the derivative of the handwritten line exceeds a threshold value can be set as a segmentation point.

Moreover, a point where a deviation of the handwritten line from a straight line between two adjacent segmentation points exceeds a threshold value can be set as a segmentation point.

The determination of segmentation points may comprise any combination of the selection criteria given above.

FIG. 8 illustrates interpreting the segmentation points of the exemplified handwritten line according to FIG. 6.

In a first step, based upon the segmentation points 1-27, a number of sample line segments A-Z are generated. The first sample line segment A is generated by setting the segmentation point 1 as SLSSP and the segmentation point 2 as SLSEP, the second sample line segment B is generated by setting the segmentation point 2 as SLSSP and the segmentation point 3 as SLSEP, and so forth.

In a second step, a sample feature set is determined for each of the sample line segments A-Z. In FIG. 8, the sample feature sets are identified as SF-A through SF-Z. Such a sample feature set SF-A-SF-Z may comprise a length, a number of angles and a type curve representing the shape of the sample line segment. These features are further illustrated in FIG. 5.

In a third step, a reference feature set can be determined for each of the sample feature sets. This may be performed by matching each of the determined sample feature sets to a database of reference feature sets. The association of one of the sample feature sets to one of the reference feature sets can be seen as a way of relating the input line segments to one of a number of predetermined line segment templates.

The number of reference feature sets may vary for different devices. For instance, a device having a large memory and high computational power may comprise a large number of reference feature sets, and a device having a small memory and low computational power may comprise a small number of reference feature sets.

Further, the number of reference feature sets may also depend on the symbols to be recognized. For instance, if a small number of symbols is to be recognized, a small number of reference feature sets may be used, and in the contrary case, if a large number of symbols is to be recognized, a large number of reference feature sets may be used.

Moreover, the type of reference feature sets may also depend on the characteristics of the symbols. For instance, if a number of symbols of the language to be recognized comprises similar line segments, a number of reference feature sets corresponding to these similar line segments may be added. By adding this number of reference feature sets, it may be easier to distinguish between these similar line segments, whereby the recognition of symbols can be made more accurate.

In a fourth step, a number of symbol sets SS1-SS6 comprising a number of reference feature sets may be determined. In FIG. 8, the symbol sets are identified as SS1 through SS6. Each of the symbol sets SS1-SS6 may represent a symbol.

In order to determine a symbol set, a symbol set database may be utilized. The symbol set database may comprise a number of combinations of reference sets and their related symbols.

For instance, the reference feature sets RF-A through RF-C may be combined into a symbol set SS1. This symbol set SS1 may, in turn, by means of the symbol set database, be associated to the symbol "d". Likewise, a symbol set SS2, comprising the reference feature sets RF-D through RF-F, may be associated to the symbol "e", and so forth.

However, all reference feature sets do not necessarily belong to a symbol set. For instance, with reference to FIGS. 7 and 8, the reference feature set RF-G corresponds to line segments of the handwritten line which connects the symbol "e" to the symbol "c".

In order to detect such reference feature sets that do not belong to a symbol set, the composition of symbols may be investigated, e.g. by using a dictionary. This type of investigation may also be used in connection with the association of a symbol set to a symbol.

Figure 9:
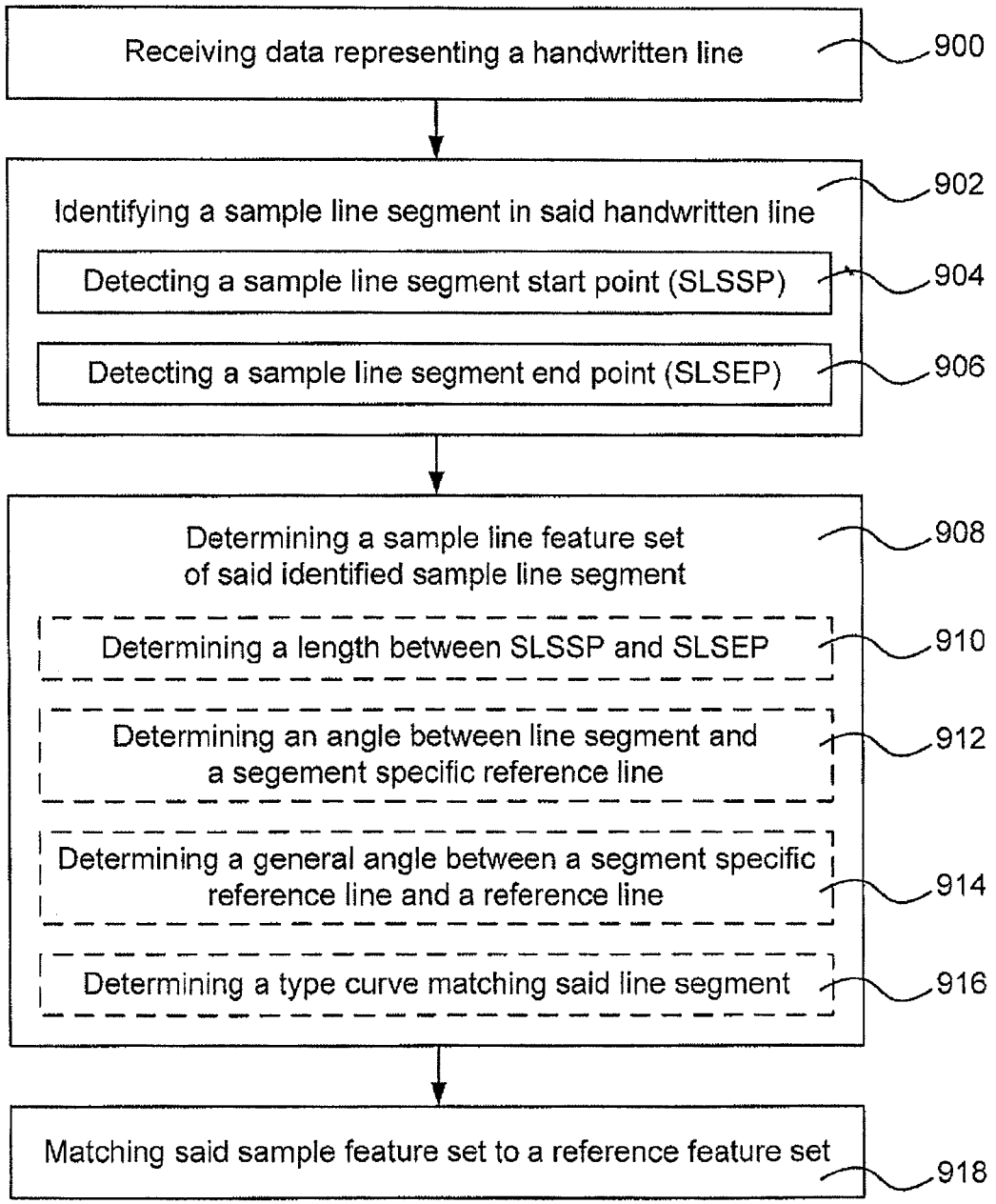
FIG. 9 is a flowchart of a method according to the present invention.

A method according to the present invention is illustrated in FIG. 9.

In a first step 900 sample data representing a handwritten line may be received.

In a second step 902 a sample line segment may be identified in said handwritten line.

In order to identify the sample line segment two sub-steps can be performed. In a first sub-step 904 a sample line segment start point (SLSSP) may be detected and in a second sub-step 906 a sample line segment end point (SLSEP) may be detected.

In a third step 908 a sample feature set of said sample line segment may be determined. Optionally, this third step may comprise a sub-step 910 of determining a length between the SLSSP and the SLSEP, a sub-step 912 of determining a first and/or a second angle between the sample line segment and a segment specific reference line x' intersecting the SLSSP and the SLSEP, a sub-step 914 of determining a general angle between the segment specific reference line x' and the reference line x, which are illustrated in FIG. 5, and a sub-step 916 of determining a type curve matching the sample line segment.

Finally, in a fourth step 918 the sample feature set can be matched to a reference feature set.

Figure 10:
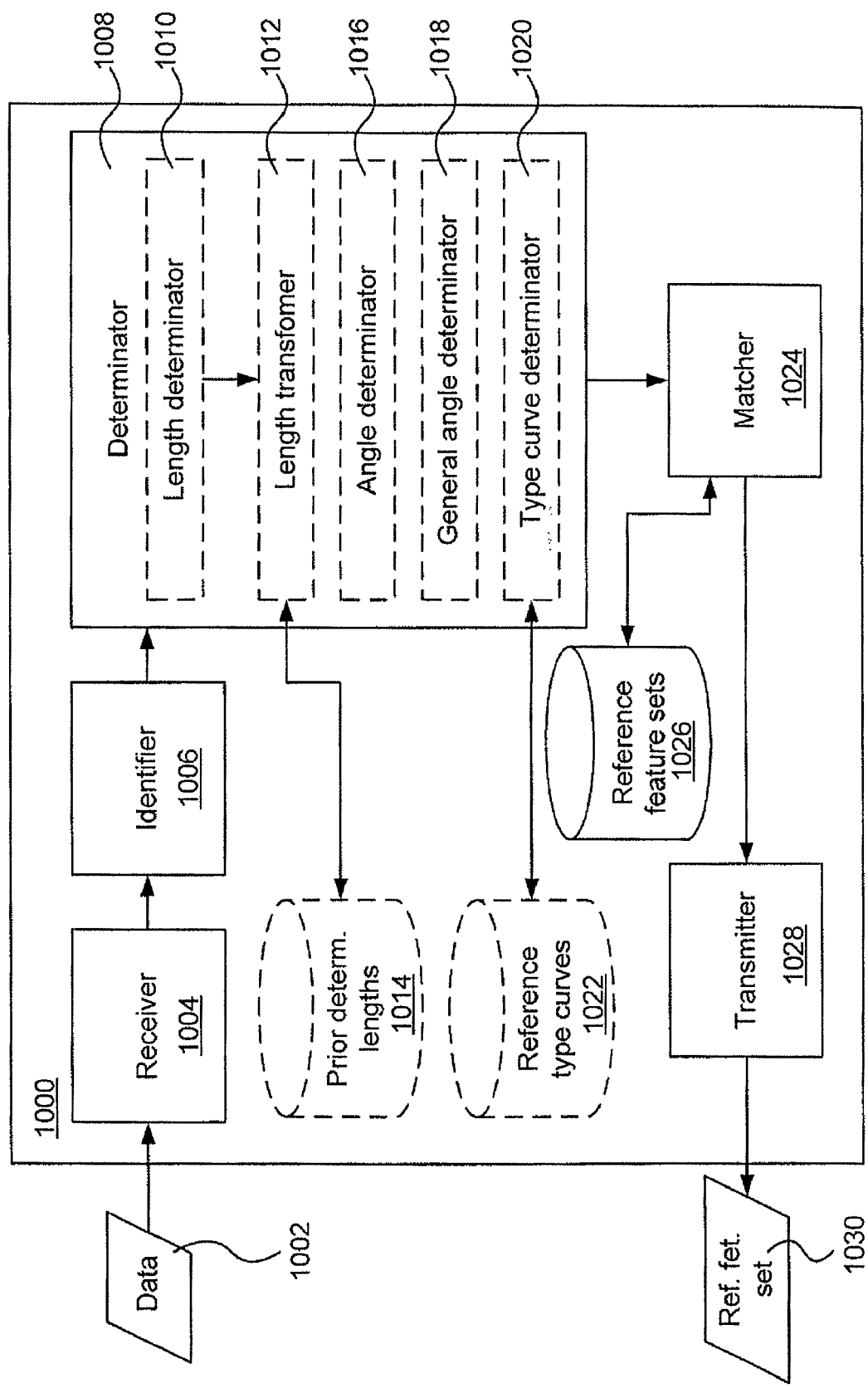
FIG. 10 schematically illustrates a module according to the present invention.

A module 1000 according to the present invention is illustrated in FIG. 10. The module may be a software implemtented module, a hardware implemented module or a combination thereof, such as an application specific integrated circuit ("ASIC").

Sample data 1002 representing a handwritten line is received by a receiver 1004, which may be included within the module 1000. The received sample data may be thereafter transferred to an identifier 1006, wherein a sample line segment may be identified as described above.

Next, the sample line segment may be transferred to a determinator 1008 in which a number of sample features can be determined. Such a feature may, for instance, be a length determined by a length determinator 1010. In order to get a relative value of the length, a comparison may be made with prior determined lengths. Such comparison may be performed by means of a length transformer 1012 in association with a database comprising prior determined lengths 1014. Another such feature may be an angle, such as a first and/or a second angle, determined by an angle determinator 1016. Still another such feature may be a general angle determined by a general angle determinator 1018. Yet another such feature may be a type curve determined by a type curve determinator 1020 in association with a database 1022 comprising reference type curves.

The feature set determined in the determinator 1008 can then be transferred to a matcher 1024, which, in association with a database comprising reference feature sets 1026, can find a matching reference feature set 1030 for the determined sample feature set.

Finally, the reference feature set 1030 can be output from the module by means of a transmitter 1028.

Figure 11:
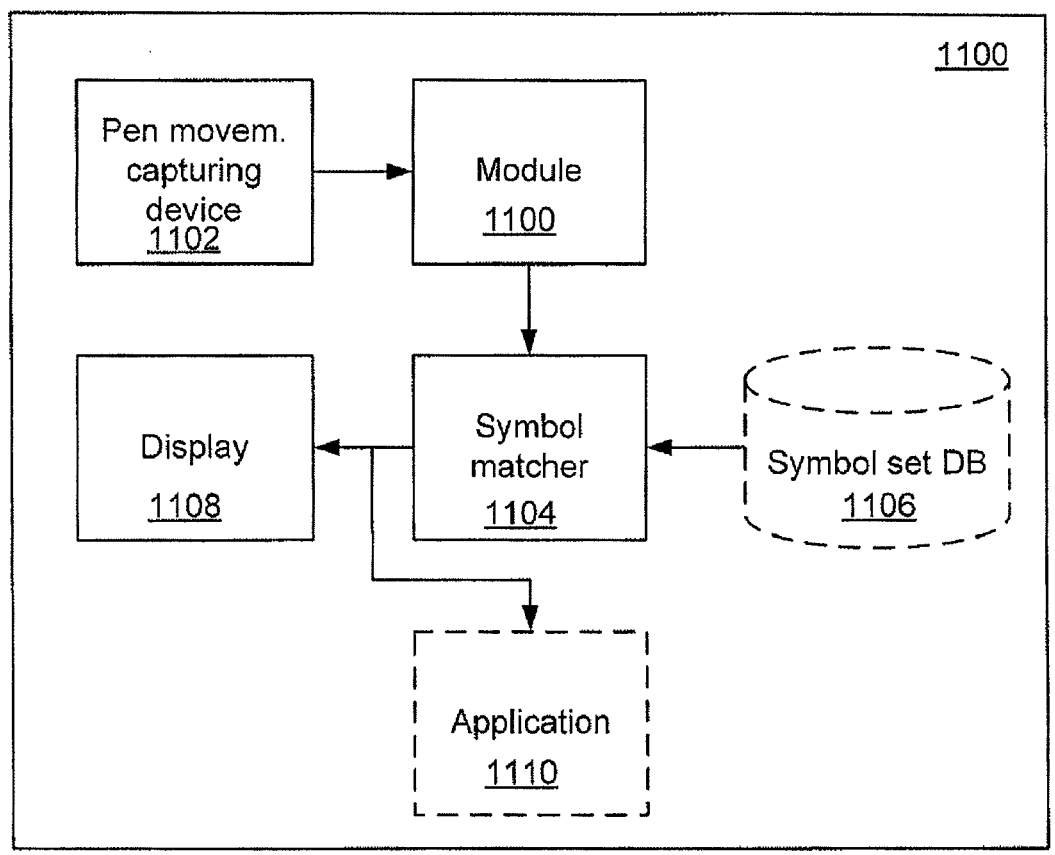
FIG. 11 schematically illustrates an apparatus according to the present invention.

An apparatus 1100 according to the present invention is illustrated in FIG. 11. The apparatus may be a communication terminal, such as a personal digital assistant ("PDA"), a mobile phone or any other data handling device.

The apparatus 1100 may comprise a pen movement capturing device 1102, such as a touch sensitive area, configured for receiving sample data representing a handwritten line. The sample data received via the pen movement capturing device 1102 can be transferred to the module 1000, as described above.

The reference feature set outputted from the module 1000 can be transferred to a symbol matcher 1104, which, in association with a symbol set database 1106, can be configured to match a number of output reference feature sets to a symbol set.

When having found the symbol set, the corresponding symbol may be shown to the user on a display 1108.

If the pen movement capturing device is embodied as a touch sensitive area, the touch sensitive area may be combined with the display of the apparatus.

Further, the symbol set may be transferred to an application 1110, such as a messaging software application.

The invention may be embodied as a computer readable memory device, such as a compact disc. Instructions that may be executed by a computer are stored on the memory device. Such a computer may include a processor for executing the instructions. The instructions may cause the computer to classify a line segment of a handwritten line into a reference feature set. The handwritten line may include one or several curves representing a plurality of symbols. The instructions may cause the computer to receive sample data representing the handwritten line, identify a sample line segment in the received sample data by detecting a sample line segment start point (SLSSP) and a sample line segment end point (SLSEP), determine a sample feature set of the identified sample line segment, and match the determined sample feature set to a reference feature set among a plurality of reference feature sets.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for classifying a line segment of a handwritten line into a reference feature set, wherein said handwritten line comprises one or several curves representing a plurality of symbols, said method comprising:
   receiving sample data representing said handwritten line;
   identifying a sample line segment in said received sample data by detecting a sample line segment start point (SLSSP) and a sample line segment end point (SLSEP);
   determining a sample feature set of said identified sample line segment, wherein said determination of said sample feature set further comprises:
      determining a first angle between a gradient of said line segment in said SLSSP and a segment specific reference line intersecting said SLSSP and said SLSEP;
      associating said first angle to said sample feature set;
      determining a second angle between a gradient of said line segment in said SLSEP and a segment specific reference line intersecting said SLSSP and said SLSEP;
      associating said second angle to said sample feature set;
      determining a general angle between the segment specific reference line intersecting said SLSSP and said SLSEP and a reference line corresponding to a writing direction; and
      associating said general angle to said sample feature set; and
   matching said determined sample feature set to a reference feature set among a plurality of reference feature sets, wherein the method is performed using a computer or processor.

2. The method according to claim 1, wherein said steps of receiving, identifying, determining, and matching are performed successively.

3. The method according to claim 1, wherein said plurality of reference feature sets are predetermined.

4. The method according to claim 1, wherein said determination of said sample feature set further comprises: determining a length between said SLSSP and said SLSEP; and associating said length to said sample feature set.

5. The method according to claim 4, wherein said determination of said length further comprises: generating a normalized length of said length by taking prior determined lengths into account.

6. The method according to claim 1, wherein said determination of said sample feature set further comprises: determining a type curve matching said line segment; and associating said type curve to said sample feature set.

7. The method according to claim 1, wherein said reference feature set comprises a minimum value and a maximum value for each feature.

8. The method according to claim 1, wherein said sample data comprises coordinate data.

9. A hardware-implemented module for classifying a line segment of a handwritten line into one reference line segment of a reference line segment set, wherein said handwritten line comprises one or several curves representing a plurality of symbols, said module comprising:
   a receiver configured to receive data representing said handwritten line;
   an identifier configured to identify a sample line segment in said received data by detecting a sample line segment start point (SLSSP) and a sample line segment end point (SLSEP);
   a determinator configured to determine a sample feature set for said identified sample line segment, wherein said determinator further comprises:
      an angle determinator configured to determine an angle between said line segment and a reference line intersecting said SLSSP and said SLSEP;
      an associater configured to associate said determined angle to said sample feature set;
      a general angle determinator configured to determine a general angle between a segment specific reference line intersecting said SLSSP and said SLSEP and a reference line corresponding to a writing direction;
      an associater configured to associate said determined general angle to said sample feature set; and
   a matcher configured to match said determined sample feature set to a reference feature set among a plurality of reference feature sets; and
   a transmitter configured to output said matching reference feature set.

10. The hardware-implemented module according to claim 9, wherein said determinator further comprises: a length determinator configured to determine a length between said SLSSP and said SLSEP; and an associater configured to associate said determined length to said sample feature set.

11. The hardware-implemented module according to claim 10, wherein said determinator further comprises: a storage medium comprising a number of prior determined lengths; a length transformer configured to normalize said length to a normalized length by taking said prior determined lengths comprised within said storage medium into account; and an associater configured to associate said determined normalized length to said sample feature set.

12. The hardware-implemented module according to claim 9, wherein said determinator further comprises: a type curve determinator configured to determine a type curve matching said line segment; and an associater configured to associate said determined type curve to said sample feature set.

13. An apparatus comprising:
a pen movement capturing device configured to receive data representing a handwritten line;
a module according to claim 9 configured to receive said data from said touch sensitive area and to output reference feature sets;
a symbol matcher configured to match said reference feature sets into a symbol set corresponding to a symbol; and
a display configured to present said symbol.

14. The apparatus according to claim 13, wherein said pen movement capturing device is a touch sensitive area.

15. The apparatus according to claim 13, further comprising a symbol set database comprising a number of reference line segment combinations and their associated symbol sets.

16. A computer readable memory device having stored thereon instructions that are executable by a computer to classify a line segment of a handwritten line into a reference feature set, wherein the handwritten line comprises one or several curves representing a plurality of symbols, the instructions causing the computer to (a) receive sample data representing the handwritten line, (b) identify a sample line segment in the received sample data by detecting a sample line segment start point (SLSSP) and a sample line segment end point (SLSEP), (c) determine a sample feature set of the identified sample line segment, determine a first angle between a gradient of said line segment in said SLSSP and a segment specific reference line intersecting said SLSSP and said SLSEP, associate said first angle to said sample feature set, determine a second angle between a gradient of said line segment in said SLSEP and a segment specific reference line intersecting said SLSSP and said SLSEP, associate said second angle to said sample feature set, determine a general angle between the segment specific reference line intersecting said SLSSP and said SLSEP and a reference line corresponding to a writing direction, and associate said general angle to said sample feature set, and (d) match the determined sample feature set to a reference feature set among a plurality of reference feature sets.

17. A method for classifying a line segment of a handwritten line into a reference feature set, wherein said handwritten line comprises one or several curves representing a plurality of symbols, said method comprising:
receiving sample data representing said handwritten line;
identifying a sample line segment in said received sample data by detecting a sample line segment start point (SLSSP) and a sample line segment end point (SLSEP);
determining a sample feature set of said identified sample line segment, wherein said determination of said sample feature set further comprises:
determining a first angle between a gradient of said line segment in said SLSSP and a segment specific reference line intersecting said SLSSP and said SLSEP;
associating said first angle to said sample feature set;
determining a second angle between a gradient of said line segment in said SLSEP and a segment specific reference line intersecting said SLSSP and said SLSEP;
associating said second angle to said sample feature set;
determining a general angle between the segment specific reference line intersecting said SLSSP and said SLSEP and a reference line corresponding to a writing direction;
associating said general angle to said sample feature set;
determining a type curve matching said line segment; and
associating said type curve to said sample feature set; and
matching said determined sample feature set to a reference feature set among a plurality of reference feature sets,
wherein the method is performed using a computer or processor.

18. The method according to claim 17, wherein said steps of receiving, identifying, determining, and matching are performed successively, wherein said plurality of reference feature sets are predetermined.

19. The method according to claim 17, wherein said determination of said sample feature set further comprises: determining a length between said SLSSP and said SLSEP; and associating said length to said sample feature set.

20. The method according to claim 19, wherein said determination of said length further comprises: generating a normalized length of said length by taking prior determined lengths into account.

21. A hardware-implemented module for classifying a line segment of a handwritten line into one reference line segment of a reference line segment set, wherein said handwritten line comprises one or several curves representing a plurality of symbols, said module comprising:
a receiver configured to receive data representing said handwritten line;
an identifier configured to identify a sample line segment in said received data by detecting a sample line segment start point (SLSSP) and a sample line segment end point (SLSEP);
a determinator configured to determine a sample feature set for said identified sample line segment, wherein said determinator further comprises:
an angle determinator configured to determine an angle between said line segment and a reference line intersecting said SLSSP and said SLSEP;
an associater configured to associate said determined angle to said sample feature set;
a general angle determinator configured to determine a general angle between a segment specific reference line intersecting said SLSSP and said SLSEP and a reference line corresponding to a writing direction;
an associater configured to associate said determined general angle to said sample feature set; a type curve determinator configured to determine a type curve matching said line segment; and
an associater configured to associate said determined type curve to said sample feature set;
a matcher configured to match said determined sample feature set to a reference feature set among a plurality of reference feature sets; and
a transmitter configured to output said matching reference feature set.

22. The hardware-implemented module according to claim 21, wherein said determinator further comprises: a length determinator configured to determine a length between said SLSSP and said SLSEP; and an associater configured to associate said determined length to said sample feature set.

23. The hardware-implemented module according to claim 22, wherein said determinator further comprises: a storage medium comprising a number of prior determined lengths; a length transformer configured to normalize said length to a normalized length by taking said prior determined lengths comprised within said storage medium into account; and an associater configured to associate said determined normalized length to said sample feature set.

* * * * *